United States Patent [19]

Wabner

[11] Patent Number: 4,834,852

[45] Date of Patent: May 30, 1989

[54] PROCESS FOR THE ACTIVATION OF HYDROGEN PEROXIDE

[75] Inventor: Dietrich Wabner, Garching, Fed. Rep. of Germany

[73] Assignee: Peroxid-Chemie GmbH, Hoellriegelskreuth, Fed. Rep. of Germany

[21] Appl. No.: 29,850

[22] Filed: Mar. 24, 1987

[30] Foreign Application Priority Data

Mar. 25, 1986 [DE] Fed. Rep. of Germany ....... 3610061

[51] Int. Cl.$^4$ ............................................. C25F 5/00
[52] U.S. Cl. .................................. 204/131; 204/128; 204/149; 210/748
[58] Field of Search ...................... 204/149, 131, 128; 210/748

[56] References Cited

U.S. PATENT DOCUMENTS

| | | | |
|---|---|---|---|
| 3,767,046 | 10/1973 | Hartkorn | 204/149 |
| 4,131,526 | 12/1978 | Moeglich | 204/1 R |
| 4,294,703 | 10/1981 | Wilms et al. | 210/674 |
| 4,350,575 | 9/1982 | Porta et al. | 204/84 |

FOREIGN PATENT DOCUMENTS 1399213  6/1975  United Kingdom .

Primary Examiner—John F. Niebling
Assistant Examiner—Kathryn Gorgos
Attorney, Agent, or Firm—Felfe & Lynch

[57] ABSTRACT

Disclosed is a process for the conversion of difficultly degradable or toxic substances into degraded or degradable substances. The substances are treated by passing direct current of 0.5 to 50 mA/cm$^2$ through an aqueous medium containing 0.5 to 10 mg/l hydrogen peroxide per COD unit.

12 Claims, 1 Drawing Sheet

PROCESS FOR THE ACTIVATION OF HYDROGEN PEROXIDE

BACKGROUND OF THE INVENTION

The use of hydrogen peroxide as an oxidizing agent is generally well known. Hydrogen peroxide can be used, for example, for the oxidation of organic substances in solution, the synthesis of organic compounds, the oxidation of alcohols and aldehydes etc. In addition to bleaching, its use in the chemical industry and, more particularly, the field of environmental protection have become increasingly important. In the field of evironmental protection in particular, the great advantage of hydrogen peroxide makes itself felt, namely that pure water is produced as a decomposition product during the reaction of hydrogen peroxide. A main field of application for hydrogen peroxide therefore is also in effluent treatment (compare for example, H. Schwarzer, Chemie-Technik 8 (1979), 67–70 and 283–286; H. Overath NATO Techn. Bericht CCMS-111 (1979) 544).

It is also well known to activate hydrogen peroxide, with the formation of hydroxyl radicals ($OH^-$) in order to increase the oxidation effect of hydrogen peroxide. The hydroxyl radical is one of the strongest chemical oxidizing agents.

A process which takes place with the formation of $OH^-$ is, for example, oxidation with Fenton's reagent, which is a mixture of hydrogen peroxide and iron(II) salts (compare, for example, H. J. H. Fenton, J. Chem. Soc. 65 (1984), 899–910; W. Feuerstein et al, Vom Wasser 56 (1981), 35–54). Oxidation with Fenton's reagent is therefore used also for effluent purification. Apart from the relatively high costs of Fenton's reagent, which become less important in the face of the urgency that frequently exists, for example during the decomposition of waste dump seepage, highly toxic, biologically non-degradable process effluent from the chemical industry etc, there remains, however, an important disadvantage regarding chemical activation of hydrogen peroxide because additional metal oxide/metal hydroxide slurries are produced as a result of the use of iron(II) ions. These slurries have to be disposed of in a sepcial way because, for example, there is the danger of redissolution by acid rain. The advantage associated with the use of hydrogen peroxide, namely that pure water is produced as a decomposition product during the reaction of hydrogen peroxide is, therefore, limited again to a large extent by the use of chemical activating agents. Therefore, the generally applicable use of chemically activated hydrogen peroxide for effluent purification did not achieve acceptance because of the disposal problem of the resulting metal hydroxide sludge.

In CH Pat. No. 605 421 discloses a process for the disinfection of bath-, drink- and industrial water using $H_2O_2$ and catalytically active metals, metal ions or metal compounds, or organic substances e.g. aldehydes or a current source to effect a catalytic degradation of $H_2O_2$. The catalysis by a current source is described using copper electrodes together with $H_2O_2$ in amounts between 0 and 10 mg/l for disinfection of bacteria containing water. However under the conditions disclosed copper is dissolved, which results again in formation of undesirable metal oxide/metal hydroxide sludge.

THE INVENTION

An object of the present invention is, therefore, the provision of a process for the conversion of difficultly degradable or toxic substances using $H_2O_2$ into biologically degradable or degraded substances which avoids the disadvantages associated with the processes known hitherto and permits a general application suitable in particular for effluent purification. This object is obtained with the present invention.

The subject of the invention is a process for the conversion of difficultly degradable or toxic substances in aqueous medium into biologically degradable or degraded substances, characterised by adding to the aqueous medium 0.5 to 10 mg/l $H_2O_2$ per COD unit and passing through a direct current with a current density of 0.5 to 50 mA/cm$^2$.

The above described invention can be carried out at a pH from 0 to 14, and more particularly is carried out at a pH which is less than 8. In another preferred embodiment, the current density has a value of 10 to 30 mA/cm$^2$.

In the invention, the electrode can be in the form of an electrode packet or other forms as later hereindescribed. The cathode material can be a special steel, titanium, nickel, graphite, synthetic carbon or valve materials such as titanium, zirconium and tantalum which have been coated wholly or partially with a platinum metal. The anodes can be graphitic or dimensionally stable valve metal anodes (DSA).

In a highly preferred embodiment, the hydrogen peroxide is added continuously with the simultaneous supply of direct current. Preferably, the hydrogen peroxide concentration is 2 to 3 mg per liter for each COD unit. While the aqueous medium may contain a number of substances, it is preferably an effluent.

The use of chemicals required during the chemical activation of hydrogen peroxide and the disadvantages associated therewith are avoided with the process according to the invention. Activation of hydrogen peroxide takes place according to the principle of external electrolysis, that is by means of suitable electrodes, with the formation of reactive products containing oxygen.

A further advantage of this process lies also in the fact that the supply of electrons, that is the activation of hydrogen peroxide, can take place in a simple manner directly at the location intended for the hydrogen peroxide treatment, i.e., in the same reaction vessel or with electrodes immersed in the effluent to be purified. As a result, time can be saved at low cost, expenditure on equipment required for supply or transport purposes is avoided and the activated hydrogen peroxide can produce its effect without any decrease in activity over time.

The aqueous medium containing hydrogen peroxide is preferably an aqueous solution of hydrogen peroxide.

The concentration of the hydrogen peroxide used depends particularly on the COD value (COD=chemical oxygen demand). As a rule, all conventional and commercial aqueous hydrogen peroxide solutions can be used in the process according to the invention, that is, in particular, 3 to 30% by weight hydrogen peroxide solutions. However, those solutions having higher or lower concentrations of hydrogen peroxide can also be used.

As a rule, the reaction rate is increased in proportion to the quantity of hydrogen peroxide. Preferably, 2 to 3 mg hydrogen peroxide/liter are used per COD unit (mg/l), but higher and lower hydrogen peroxide concentrations can also be used. If economic aspects are taken into account (if possible, low hydrogen peroxide concentration with an acceptable rate of reaction), the hydrogen peroxide concentration should however lie within the range of between 0.5 mg/l and 100 mg/l. The pH of the aqueous medium is not critical and can generally lie within a wide pH range, from strongly alkaline (pH=14) to strongly acidic (pH=0). The choice of advantageous and preferred pH ranges depends in particular, on the intended application and the reaction period. Oxidation, for example, purification of effluent by oxidation, generally takes place more quicky at pH values of <8. In the process according to the invention, however, it is also possible to operate at alkaline pH values. In the case of oxidation with Fenton's reagent, on the other hand, the effluent first had to be brought to the acid pH range because of the metal hydroxides precipitating in that case. Although as a rule a pH of <8, more particularly <7 is preferred, it is advantageous in some cases, more particularly during effluent treatment, to operate at higher pH values.

The direct current used to activate the hydrogen peroxide should generally be applied with a current density of not less than 0.5 mA/cm$^2$. Lower current densities usually lead to a course of operation which is unsatisfactory from a practical point of view, more particularly with regard to the rate of reaction, for example, the rate of decomposition of effluent impurities. By increasing the current density, the rate of reaction is usually increased proportionally, i.e. for example, doubling the current density roughly corresponds to a rate of reaction which is twice as high. Above a current density of approximately 30 mA/cm$^2$, the process improvement, more particularly in terms of the rate of reaction, which accompanies an increase in the current-density, decreases to an increasing extent, and virtually no further process improvement is achieved as the current consumption increases above a current density of approximately 50 mA/cm$^2$. From an economic point of view, current densities of more than 50 mA/cm$^2$ are, therefore, no longer advantageous. The range of 10 to 30 mA/cm$^2$ is preferred. It is assumed that an induced coupled reaction or a chain reaction is initiated by the current densities used according to the invention. Like the other process parameters, for example hydrogen peroxide concentration, pH but also process temperature, residence time, material, form and structure of the electrodes and electrolysis cells, the most advantageous values or embodiments of individual process parameters do, however, depend more particularly also on the intended application and on the other process conditions.

The process temperature is not critical. Generally, the temperature affects the course of operations in accordance with the well known rule, according to which a temperature increase brings about an increase in the rate of reaction. However, the process improvement as a result of temperature increase, is limited by the competing reaction of hydrogen peroxide decomposition, rate of which likewise increases as the temperature increases. As a rule, the process can, however, be carried out at normal ambient temperature or outside temperature but also at lower temperatures. This is of particular importance, for example, during effluent purification which is to be carried out directly in clarification plants.

The residence time of the substances such as effluent to be oxidized, i.e. to be converted into a degradable substance or degraded with the hydrogen peroxide activated according to the invention, depends not only on the other process parameters and the application but also in particular on the desired degree of oxidation, degree of decomposition or degree of purification and the half life of the substances to be degraded. The half life depends, in turn, on the equipment used and the other process conditions. Advantageously, the substances to be treated, for example effluent to be purified are agitated or circulated in the reaction vessel by suitable equipment, for example stirrers or pumps.

In principle, all electrodes which have a sufficiently long useful life, i.e. especially not become dissolved under the process conditions, can be used as electrodes (cathodes, anodes) for the supply of current. According to the invention, suitable electrodes or electrode materials are, for example, those described in the following publications:

A. T. Kuhn and P. M. Wright, Electrodes for Industrial Processes, in A. T. Kuhn, Industrial Electrochemical Processes, Elsevier, London, 1971, pages 101, 118, 122, 233, 548 and 561; D. Pletscher. Industrial Electrochemistry, Chapman and Hall, London 1982, pages 63, 92, 115, 129, 133, 136, 162, 176, 181, 186 and 202; U. Landau et al, Electrochemistry in Industry, Plenum Press New York 1982, pages 19–28, 32, 183, 236, 276 and 274; D. Pletscher, J. Appl. Electrochem. 14 (1984) 403–415; M. M. Jaksic, Electrochim. Acta 29 (1984) 1539–1550; and S. Trasatti, Electrodes of Conductive Metallic Oxides No. 11 from "Studies in Physical and Theoretical Chemistry", Part A, (1980), Part B (1981), Elsevier, London).

According to the invention, suitable cathodes are preferably those made of special steel, titanium, graphite, synthetic carbon, nickel and valve metal cathodes in which a valve metal, for example titanium, zirconium or tantalum is coated wholly or partially with a platinum metal. Of the noble metal cathodes, those in which the noble metal is present in the nonoxidized form are preferred in particular because their useful life is better under the process conditions than that of cathodes in which the noble metal is present in the oxidized form.

According to the invention, suitable anodes should have a sufficient resistance to oxidation, passivation and corrosion; preferably, anodes made of graphite are used, and more particularly, dimensionally stable valve metal anodes (DSA) with a coating of platinum metal oxides, spinels or other oxides.

It is advantageous to arrange the electrodes in such a way that there is good contact, if possible, between electrodes and hydrogen peroxide. The required contact can be obtained, for example, by means of a suitable arrangement or the use of special electrode surfaces such as, for example, by using expanded metals, grids, perforated screens, packings of electrode granules etc.

Two, or advantageously, a plurality of electrodes as in the form of an electrode packet, can be used and the reaction vessel (electrolysis cell) can be arranged in the usual way for electrolysis cells. The anode space and cathode space can also be separated by a diaphragm. In order to circulate the solutions containing hydrogen peroxide or the substances to be oxidized, for example effluent, it can be advantageous to equip the reaction vessels with suitable stirring equipment and/or pumps. The control of the electrolysis cells can be mono-polar or multi-polar. The walls of the vessel receiving the hydrogen peroxide can also be designed as one or more electrodes. FIGS. 1 to 3 show electrode arrangements and electrolysis cells of the kind that can be used, for example, for the process according to the invention.

FIG. 1 shows a diagrammatic perspective representation of an electrode packet with titanium extended metal cathodes ($6 \times 100$ cm$^2$) (1) and extended metal anodes ($5 \times 100$ cm$^2$) (2) which are attached to a rod-like spacer (3) made of PVC (diameter 0.3 to 0.4 cm).

An advantage of the process according to the invention is also the fact that neither metal cations are required nor are such metal cations troublesome if they are present in the reaction mixture.

Preferably, the hydrogen peroxide is added continuously with the simultaneous supply of direct current.

With the process according to the invention it is possible to degrade completely highly polluted toxic effluent. For economic reasons, however, degradation is carried out preferably only as far as the biologically degradable stage.

Figure 1:
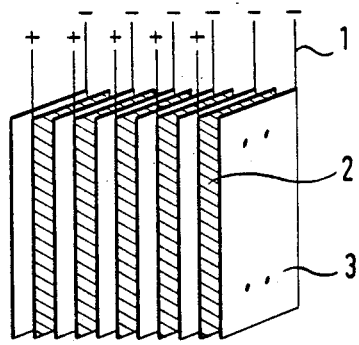
Figure 2A:
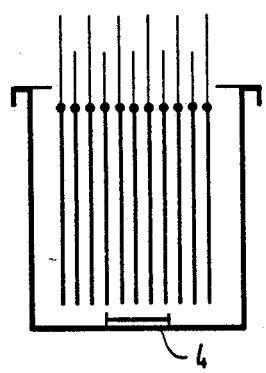
FIG. 2 shows a side view (a) and a view from above (b) of an electrolysis cell composed of a glass beaker with a capacity of 1 liter into which the electrode packet of FIG. 1 is immersed, and which is equipped at the base with a magnetic stirrer (4).
Figure 2B:
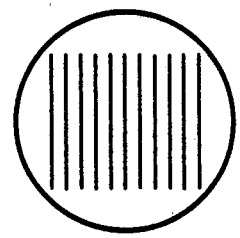
Figure 3:
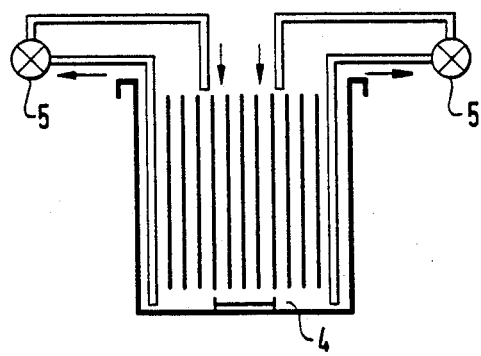
FIG. 3 shows the side view of another arrangement of an electrolysis cell of the kind described in FIG. 2 which contains, in addition to the magnetic stirrer (4), two pumps (5). The pumps are hose pumps with pump, pump head, gears (Heidolph type RGL 85) and control device (Heidolph Type ST 1)

The Examples below explain the invention in more detail without limiting it thereto. Unless otherwise specified, the percentages and parts refer to the weight, and temperature data refer to the Celsius scale. The oxidation treatment with hydrogen peroxide activated according to the invention was carried out in the Examples in electrolysis cells which correspond in structure to the cells shown in FIGS. 2 and 3.

EXAMPLES

EXAMPLE 1

The starting product was waste dump seepage with a conductivity of 12 mS, and a COD content of 11,800 mg/l; pH=4. Hydrogen peroxide was added over a period of 1 hour. Concentration: 23,000 mg H$_2$O$_2$/l, current density 40 mA/cm$^2$, ambient temperature, electrode surface area 500 cm$^2$/l. The electrode packet was composed of 5 special steel cathodes (V2A) and 4 anodes made of thermally platinised titanium.

Degradation took place with a half life of 2 hours over a total period of 8.5 hours. At the end of the reaction, the COD content was 200 mg/l.

EXAMPLE 2

Operations were carried out under the conditions given in Example 1 with the waste dump seepage of Example 1 as starting product. Hydrogen peroxide was added over a period of 1 hour; hydrogen peroxide concentration: 12,000 mg/l. Half life 0.8 hours; total treatment time: 4 hours. Degradation to a COD value of 5,200 mg/l.

EXAMPLE 3

The starting material was untreated water containing pyridine (pyridine content 20 mg/l) with a conductivity of 0.5 mS, a sodium phosphate content of 1.4 mg/l and a pH of 1.5. The electrodes described in Example 1 were used. The current density was 30 mA/cm$^2$. The half life was 28 minutes; the total degradation time was 160 minutes.

EXAMPLE 4

The starting product was an aqueous solution containing 0.01M sodium sulphate and 100 mg/l phenol with a pH of 7.

Operations were carried out with the electrodes described in Example 1; current density 15 mA/cm$^2$. The hydrogen peroxide was added in a molar ratio of 2:1 to phenol. The half life was 17.5 minutes, the total degradation time 90 minutes.

EXAMPLE 5

Operations were carried out with an electrolyte containing 1.4 g sodium sulphate/l, and contained p-chlorobenzene, pentachlorophenol and other toxic halogen compounds in a quantity of 10 mg/l as model substance. The current density was 2.0 mA/cm$^2$. Operations were carried out with the conditions and electrodes described in Example 1. The half life was 6 minutes, the total degradation time 80 minutes.

It will be understood that the specification and examples are illustrative but not limitative of the present invention and that other embodiments within the spirit and scope of the invention will suggest themselves to those skilled in the art.

I claim:

1. A process for the conversion of difficultly degradable or toxic substances in aqueous medium into biologically degradable or degraded substances, comprising: adding 0.5 to 10 mg/l H$_2$O$_2$ per COD unit to the aqueous medium containing the degradable or toxic substances; and passing between a cathode and an anode a direct current with a current density of 0.4 to 50 mA/cm$^2$ through the aqueous medium to convert the substance into a biologically degradable or degraded substance, said anode consisting essentially of a material so that said anode does not dissolve in the process.

2. The process of claim 1, wherein the pH of the aqueous medium is 0 to 14.

3. The process of claim 1, wherein the current density is 10 to 30 mA/cm$^2$.

4. The process of claim 1 wherein the cathode material is selected from the group of special steel, titanium, nickel, graphite, synthetic carbon or valve metals coated wholly or partially with platinum metal.

5. The process of claim 4, wherein the valve metals are titanium, zirconium and tantalum.

6. The process of claim 1 wherein as anodes, graphite anodes or dimensionally stable valve metal anodes (DSA) are used.

7. The process of claim 1, wherein the hydrogen peroxide is added continuously, with the simultaneous supply of direct current.

8. The process of claim 1, wherein the aqueous medium is an effluent.

9. The process of claim 1, wherein 2 to 3 mg hydrogen peroxide/liter are used per COD unit.

10. The process of claim 1, wherein one or more of the electrodes are in the form of an expanded metal, a grid, a perforated screen or packings of electrode granules.

11. The process of claim 1, wherein the electrodes are in the form of an electrode packet.

12. The process of claim 1, wherein the pH is less than 8.

* * * * *